(12) United States Patent
Yuan et al.

(10) Patent No.: US 8,687,908 B2
(45) Date of Patent: *Apr. 1, 2014

(54) SAMPLE BASED TONE MAPPING METHOD FOR HIGH DYNAMIC RANGE IMAGES

(71) Applicant: Peking University, Beijing (CN)

(72) Inventors: Xiaoru Yuan, Beijing (CN); Peihong Guo, Beijing (CN)

(73) Assignee: Peking University, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/853,682

(22) Filed: Mar. 29, 2013

(65) Prior Publication Data

US 2013/0223746 A1 Aug. 29, 2013

Related U.S. Application Data

(63) Continuation of application No. 12/568,584, filed on Sep. 28, 2009, now Pat. No. 8,433,150.

(51) Int. Cl.
*G06K 9/00* (2006.01)
*G06F 17/24* (2006.01)
*H04N 9/31* (2006.01)

(52) U.S. Cl.
CPC ............ *G06F 17/243* (2013.01); *H04N 9/3194* (2013.01)
USPC ........................................................ 382/254

(58) Field of Classification Search
USPC ........................................................ 382/254
See application file for complete search history.

(56) References Cited

U.S. PATENT DOCUMENTS

| 6,888,552 | B2 | 5/2005 | Debevec et al. |
| 7,860,308 | B2 * | 12/2010 | Shah ............................. 382/170 |
| 7,958,462 | B2 * | 6/2011 | Hashima et al. ................ 716/50 |
| 2005/0104900 | A1 | 5/2005 | Toyama et al. |
| 2006/0158462 | A1 | 7/2006 | Toyama et al. |
| 2007/0014470 | A1 | 1/2007 | Sloan |
| 2007/0291189 | A1 | 12/2007 | Harville |
| 2008/0131016 | A1 | 6/2008 | Kokemohr |
| 2009/0041376 | A1 | 2/2009 | Carletta et al. |

OTHER PUBLICATIONS

Debevec, P. E., and Malik, J., "Recovering High Dynamic Range Radiance Maps from Photographs," ACM SIGGRAPH, 1997, vol. 31, Issue: 1, pp: 369-378.
Durand, F., and Dorsey, J., "Fast Bilateral Filtering for the Display of High-Dynamic-Range Images," ACM SIGGRAPH, 2002, vol. 21, Issue: 3, pp. 257-266.
Fattal, R., "Gradient Domain High Dynamic Range Compression," ACM SIGGRAPH, 2002, vol. 21, Issue: 3, pp. 249-256.
Reinhard, E., "Photographic Tone Reproduction for Digital Images," ACM SIGGRAPH, 2002, vol. 21, Issue: 3, pp. 267-276.
Seetzen, H., "High Dynamic Range Display Systems," ACM SIGGRAPH, 2004, vol. 23, Issue: 3, pp. 760-768.

* cited by examiner

*Primary Examiner* — Hadi Akhavannik
(74) *Attorney, Agent, or Firm* — Brundidge & Stanger, P.C.

(57) ABSTRACT

The disclosure relates to adjusting intensities of images. The method includes receiving information identifying of a plurality of regions within an image; receiving an intensity adjustment of at least one of the plurality of regions; adjusting the intensities of the at least one plurality of regions based on the received intensity adjustment; interconnecting at least two of the plurality of regions by applying a two-dimensional method; generating intensity adjustments for at least one pixel outside the plurality of regions based on the received intensity adjustment of at least one of the plurality of regions and the interconnection of at least two of the plurality of regions; and applying the generated intensity adjustments to the image.

20 Claims, 5 Drawing Sheets

SAMPLE BASED TONE MAPPING METHOD FOR HIGH DYNAMIC RANGE IMAGES

CROSS-REFERENCE TO RELATED APPLICATIONS

The present application is a continuation of U.S. application Ser. No. 12/568,584, filed Sep. 28, 2009, now U.S. Pat. No. 8,433,150, the contents of which are hereby incorporated by reference into this application as if set forth herein in full.

BACKGROUND

High dynamic range images have a greater dynamic range of luminance between light and dark areas of a scene than normal images. This permits a more accurate representation of the wide range of intensity levels found in real scenes ranging from direct sunlight to shadows. However, high dynamic range images may not be directly viewed on an average display device due to limitations of the display device.

SUMMARY

A method is described for adjusting intensities of images. The method includes receiving information identifying of a plurality of regions within an image; receiving an intensity adjustment of at least one of the plurality of regions; adjusting the intensities of the at least one plurality of regions based on the received intensity adjustment; interconnecting at least two of the plurality of regions by applying a two-dimensional method; generating intensity adjustments for at least one pixel outside the plurality of regions based on the received intensity adjustment of at least one of the plurality of regions and the interconnection of at least two of the plurality of regions; and applying the generated intensity adjustments to the image.

Furthermore, the present disclosure describes an apparatus for intensity mapping of image data. The apparatus includes a receiver that receives information identifying of a plurality of regions within an image and receiving an intensity adjustment of at least one of the plurality of regions; an adjustment unit that adjusts the intensities of the at least one plurality of regions based on the received intensity adjustment; a interconnection unit that interconnects at least two of the plurality of regions by applying a two-dimensional method; an intensity generation unit that generates intensity adjustments for at least one pixel outside the plurality of regions based on the received intensity adjustment of at least one of the plurality of regions and the interconnection of at least two of the plurality of regions; and an intensity application unit that applies the generated intensity adjustments to the image.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
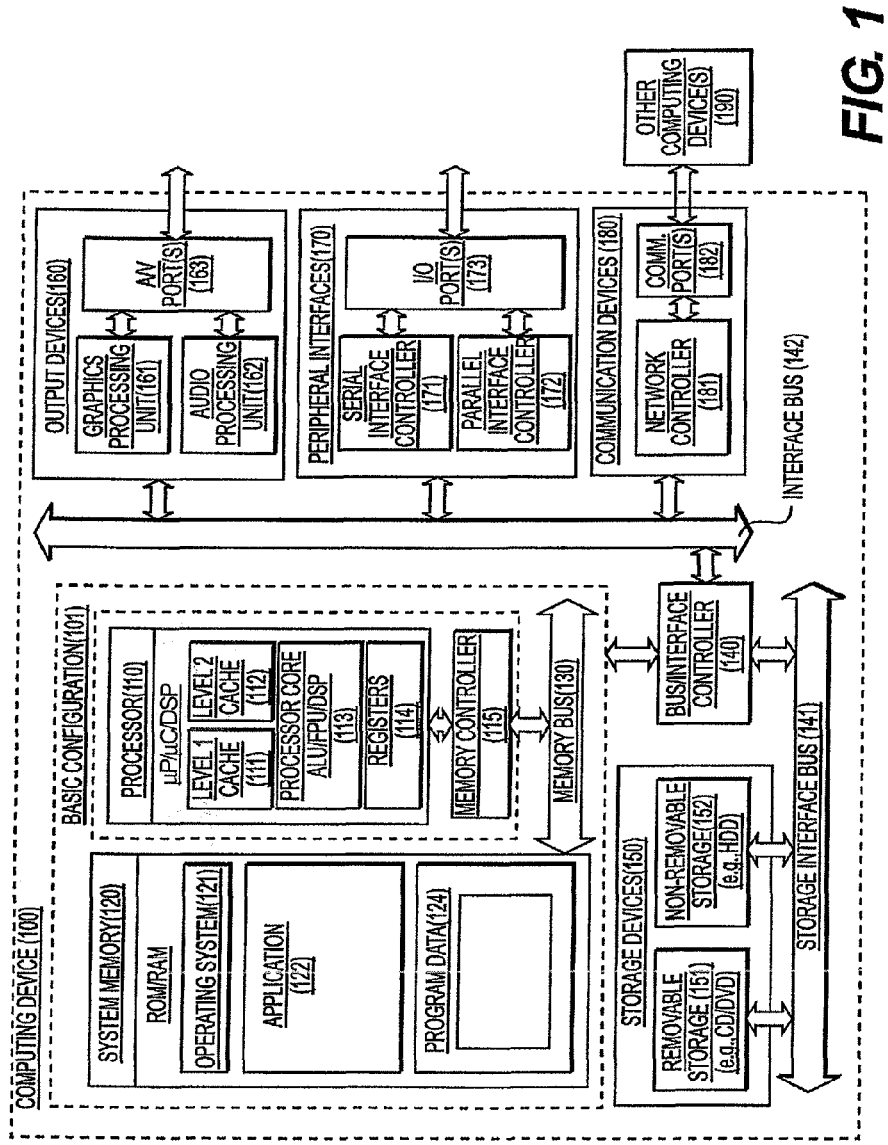
FIG. 1 is a block diagram illustrating an example of a configuration of a computing device arranged to process images, according to an example embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The present disclosure is directed to, inter alia, methods, apparatus, computer programs and systems for processing image data. Specifically, image data is processed by receiving information identifying of a plurality of regions within an image; receiving an intensity adjustment of at least one of the plurality of regions; adjusting the intensities the at least one plurality of regions based on the received intensity adjustment; interconnecting at least two of the plurality of regions by applying a two-dimensional method; generating intensity adjustments for at least one pixel outside the plurality of regions based on the received intensity adjustment of at least one of the plurality of regions and the interconnection of at least two of the plurality of regions; and applying the generated intensity adjustments to the image.

This disclosure provides a new intensity mapping algorithm on converting high dynamic images to regular low dynamic range images. Different from traditional intensity mapping methods, in the present disclosure a user can directly work on an original high dynamic range image, or on a high dynamic range image whose intensity has been adjusted, and select a few locations to manually adjust the output intensity of the corresponding pixels, (e.g. pre-define the tone mapping results of the selected locations, which will become the precondition, i.e. input parameters, of the following processing). The system may compute the output pixel intensity of all remaining image pixels outside the selected areas based on the manual adjusting result. Therefore, the intensity of the input high dynamic range image is "tone mapping" according to the samples given by the users.

The use of the term "image" in this disclosure is not intended be limited to a particular file type or data format. Instead, the term "image" as used in this disclosure may encompass content from any image file type or data format (JPEG, BMP, etc.), any graphically rendered document (e.g., a webpage or HTML document), a computer-aided design (CAD) application, scanned photographs or documents (e.g., in PDF format), or any other type of computer-generated image.

FIG. 1 is a diagram illustrating a system environment in which the features disclosed herein may be implemented. In a very basic configuration 101, computing device 120 typically includes one or more processors 110 and system memory 120. A memory bus 130 can be used for communicating between the processor 110 and the system memory 120.

Depending on the desired configuration, processor 110 can be of any type including but not limited to a microprocessor (µP), a microcontroller (µC), a digital signal processor (DSP), or any combination thereof. Processor 110 can include one more levels of caching, such as a level one cache 111 and a level two cache 112, a processor core 113, and registers 114. The processor core 113 can include an arithmetic logic unit (ALU), a floating point unit (FPU), a digital signal processing core (DSP Core), or any combination thereof. A memory controller 115 can also be used with the processor 110, or in some implementations the memory controller 115 can be an internal part of the processor 110.

Depending on the desired configuration, the system memory 120 can be of any type including but not limited to volatile memory (such as RAM), non-volatile memory (such as ROM, flash memory, etc.) or any combination thereof. System memory 120 typically includes an operating system 121, one or more applications 122, and program data 124. Application 122 may include an image processing algorithm 123 that is arranged to process original image data. Program data 124 may include data 125 that defines certain variable parameters (e.g., user-defined parameters), and/or certain rules, algorithms, and/or compression ratios for processing image data.

Referring again to FIG. 1, computing device 120 can have additional features or functionality, and additional interfaces to facilitate communications between the basic configuration 101 and any required devices and interfaces. For example, a bus/interface controller 140 can be used to facilitate communications between the basic configuration 101 and one or more data storage devices 150 via a storage interface bus 141. The data storage devices 150 can be removable storage devices 151, non-removable storage devices 152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 120, removable storage 151 and non-removable storage 152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 120. Any such computer storage media can be part of device 120.

Computing device 120 can also include an interface bus 142 for facilitating communication from various interface devices (e.g., output interfaces, peripheral interfaces, and communication interfaces) to the basic configuration 101 via the bus/interface controller 140. Example output devices 160 include a graphics processing unit 161 which may be configured to communicate to the display device 130, and an audio processing unit 162 which may be configured to communicate to speakers, via one or more AN ports 163. Example peripheral interfaces 170 include a serial interface controller 171 or a parallel interface controller 172, which can be configured to communicate with external devices such as input devices (e.g., keyboard, mouse, pen, voice input device, touch input device, etc.) or other peripheral devices (e.g., printer, scanner, etc.) via one or more I/O ports 173. An example communication device 180 includes a network controller 181, which can be arranged to facilitate communications with one or more other computing devices 190 over a network communication via one or more communication ports 182. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 100 can also be implemented as a personal computer including both laptop computer and non-laptop computer configurations.

Figure 2:
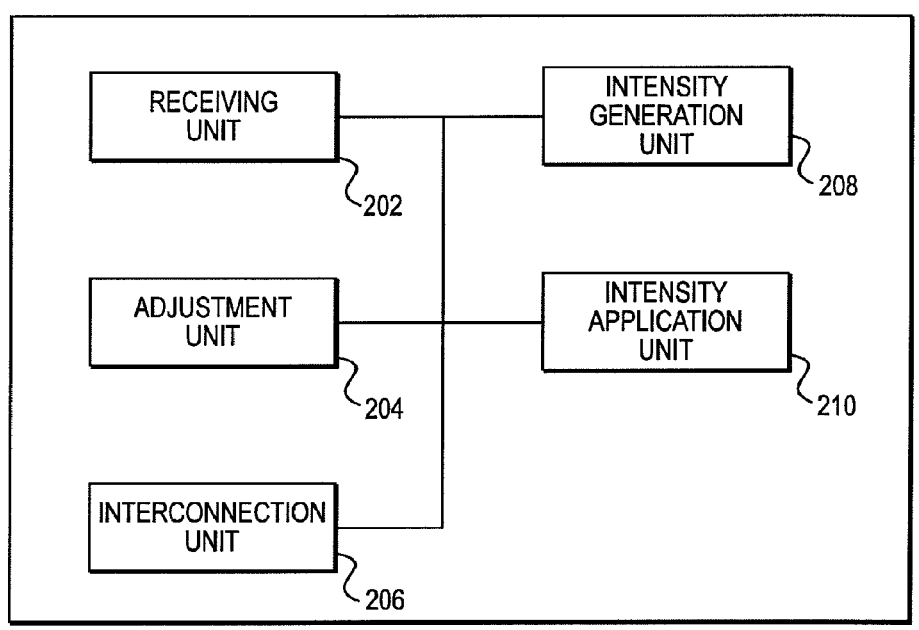
FIG. 2 is a block diagram illustrating an example of a configuration of an application within a computing device arranged to process images, according to an example embodiment.

FIG. 2 is a block diagram block diagram illustrating an example of a configuration of an application within a computing device arranged to process images, according to an example embodiment. Application 122 may include receiving unit 202, adjustment unit 204, interconnection unit 206, intensity generation unit 208 and intensity application unit 210.

Receiving unit 202 may receive or access an image from storage devices 150, from peripheral interfaces 170, etc. The image may be an original image A. A tone mapping algorithm may be applied to original image A resulting in image A'. In addition, or alternatively, the original image A may have an intensity adjustment applied thereto using a tone mapping method resulting in image A'. The intensity adjustment may be, for example, i) Photographic Tone Reproduction for Digital Images Erik Reinhard, Michael Stark, Peter Shirley, Jim Ferwerda ACM SIGGRAPH 2002; ii) Fast Bilateral Filtering for the Display of High Dynamic Range Images Fredo Durand, Julie Dorsey ACM SIGGRAPH 2002; iii) Gradient Domain High Dynamic Range Compression Raanan Fattal, Dani Lischinski, Michael Werman ACM SIGGRAPH 2002, etc.

The receiving unit 202 further receives information identifying a plurality of regions, i.e., 3, 4, 5, 6, etc., within the received image. The information identifying a plurality of regions may be received at peripheral interfaces 170, received from storage devices 150, etc. It may be appreciated that the higher the number of selected areas, the more advantageous the result is.

The selected regions may be any shape such as a circle, a square, an irregular shape, etc. The region may include a group of pixels. The size of the region may vary, may be predetermined, etc. The region may be selected, i.e., by using brush tool, line tool, etc., provided by a user interface application providing within computing device 100. In addition, one or more selected regions may touch one or more other selected regions or may not touch any other selected region.

Still further, the receiving unit 202 receives information relating to an intensity adjustment with respect to each region identified in the image. The information identifying intensity adjustment of a plurality of regions may be received at peripheral interfaces 170, received from storage devices 150, etc.

The information identifying intensity adjustment of each of the plurality of identified regions may not only identify an adjustment of pixel intensity of the selected regions, but may also, alternatively, include additional information identifying the adjustment of the pixel intensity of the identified regions' neighborhood points on the image.

Adjustment unit 204 adjusts the intensity of the identified regions based on the received information identifying the adjustment of the identified region thereby resulting in image A. The adjustment may be a linear or a non-linear adjustment. For example, interpolation may be based on Voronoi triangulation. The adjustment may not include the manually adjusted pixel intensities. The manual adjusted pixel intensities may be used input for the interconnection unit 2076, the intensity generation unit 208 and the intensity application unit 210 as discussed herein.

Interconnection unit 206 interconnects at least two of the plurality of regions by applying, for example, a two dimensional method. The manually adjusted pixel intensities may be used as input data for the method discussed herein. For example, two or more of the identified regions may be triangulated by using, i.e., the Delaunay Triangulation method. It may be appreciated that other interconnection methods, i.e., triangulation methods, may be used.

Intensity generation unit 208 generates intensity adjustments for at least one pixel outside identified plurality of regions based on the interconnection made by the interconnection unit and based on the received intensity adjustment through interpolation and/or extrapolation, for example. Interpolation and extrapolation may be performed out by using, i.e., Barycentric interpolation/extrapolation method. It may be appreciated that other interpolation/extrapolation methods may be used. The interpolation and extrapolation is performed to calculate intensity adjusting factors for the remaining pixels on the image based on the intensity adjusting factors received and adjusted in the adjustment unit 204.

For example, if a pixel of a selected point has an intensity value of 100000 on an original image A, as identified above, 200 on the tone mapped A', as identified above, and 150 on the intensity adjusted image A", as identified above, the intensity adjusting factors for the pixel may be determined to be $150/100000$, which may be employed as input for the interpolation/extrapolation process to calculate the intensity adjusting factors of those unselected pixels.

The intensity value of those unselected pixels may then be calculated by severally multiplying the corresponding intensity adjusting factors obtained from the interpolation/extrapolation process with the original intensity value of the unselected pixels.

Intensity application unit 210 applies the intensity values determined in the intensity generation unit 208 to the tone mapped image as for the unselected pixels so as to generate a resultant image. For example, the intensity values may be applied based on linear interpolation or other high order interpolation, based on radial base functions, etc.

It may be appreciated that the functionality of the intensity generation unit 208 and intensity application unit 210 may be performed by using OpenGL APIs provided at chip level so as to save processing time.

Figure 3:
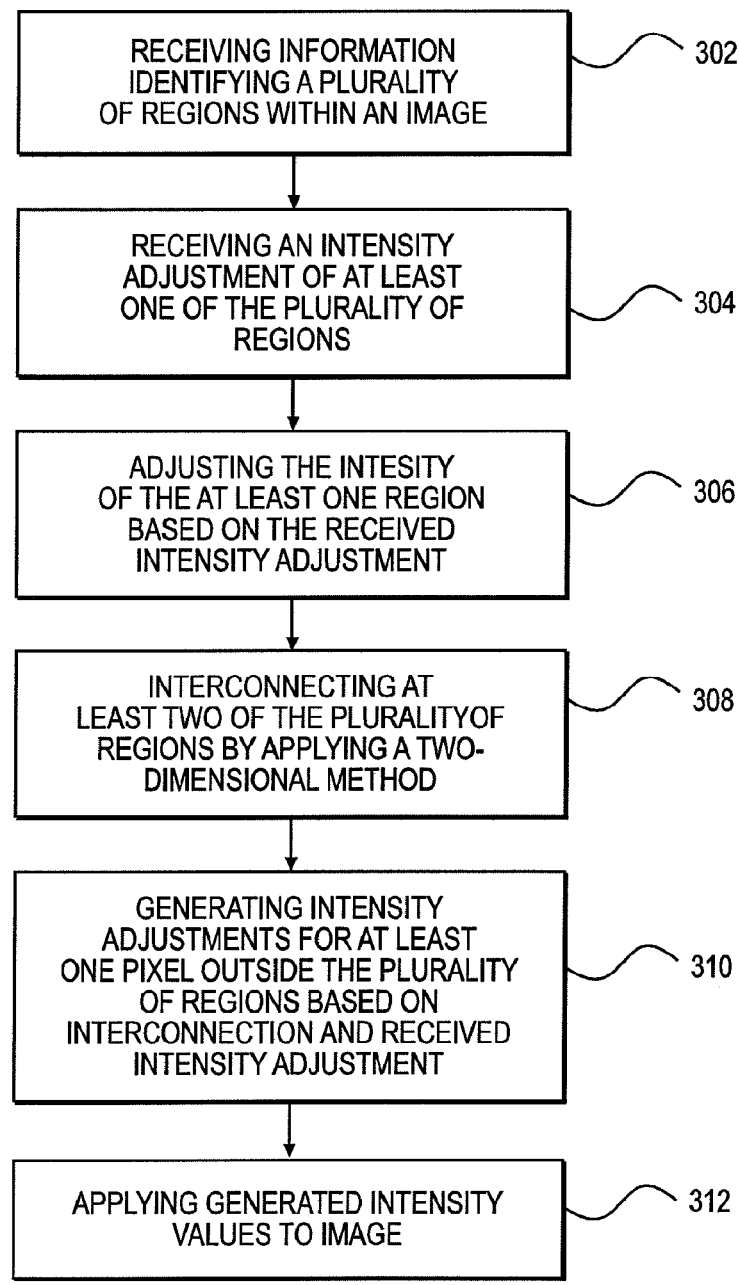
FIG. 3 is a flow diagram illustrating a method for processing images, according to an example embodiment.

FIG. 3 illustrates a flow diagram of the method for processing image data performed by the computing device, according to an example embodiment. As shown in step S302, computing device 100 receives information identifying of a plurality of regions within an original image A. The image may include unprocessed or RAW image data or may include image data A' that has been tone mapped.

The original image data A or image data A' may be obtained from one of storage devices 150, received from a peripheral device 170, i.e., an external device, for example, an image capturing device, etc.

The receiving unit 202 then receives an intensity adjustment of at least one of the identified plurality of regions (S604). The adjustment unit 204 adjusts the intensities of at least one of the identified plurality of regions based on the received intensity adjustment (S306). The interconnection unit 206 interconnects at least two of the plurality of regions by applying a two-dimensional method (S308). The intensity generation unit 208 generates intensity adjustments for at least one pixel outside the plurality of regions based on the received intensity adjustment of at least one of the plurality of regions and the interconnection of at least two of the plurality of regions (S310). The intensity application unit 210 applies the generated intensity adjustments to the image to form a final image (S312).

It may be appreciated by one skilled in the art that further adjustment on the pixels in the final image may be made. In other words, the flow in FIG. 3 may be repeated by implementing the final image as the original image, wherein, in step 302, the plurality of regions are identified in the final image and the adjustments are made based on the identified plurality of regions in the final image. The steps depicted in FIG. 3 may be repeated any number of times until satisfying results are achieved.

Figure 4A:
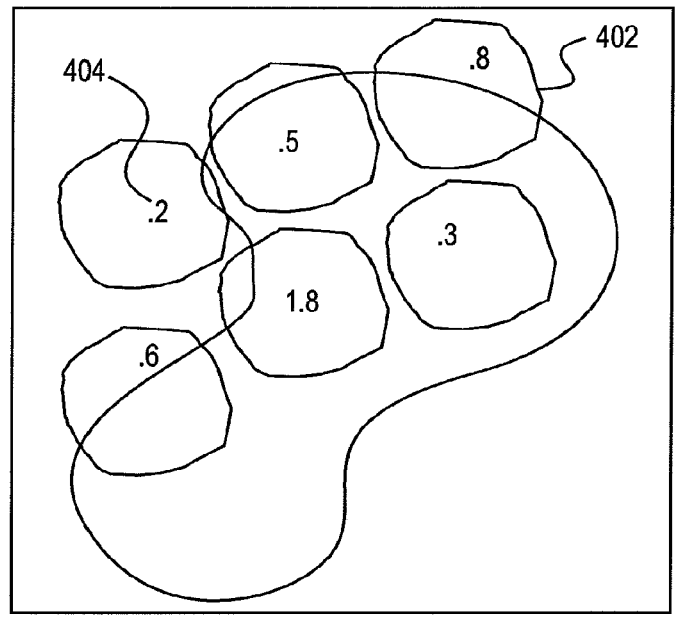
FIGS. 4A-4C is a diagram illustrating an example of image processing according to an example embodiment.
Figure 4B:
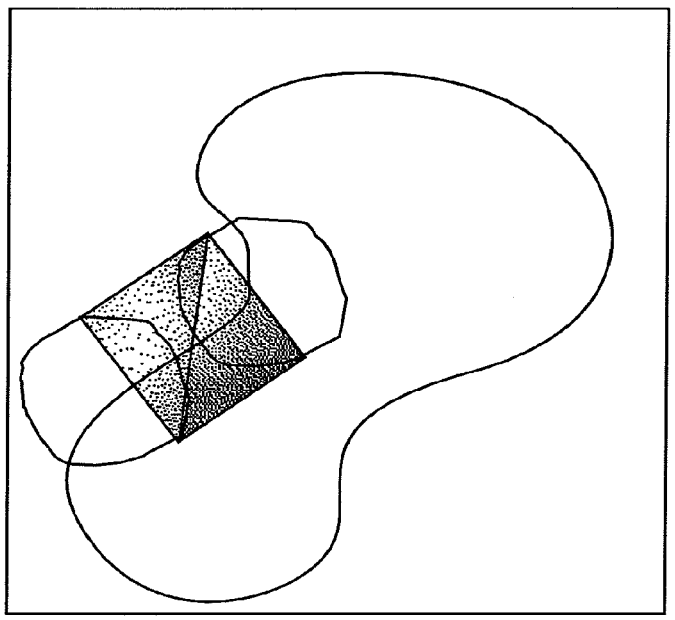
Figure 4C:
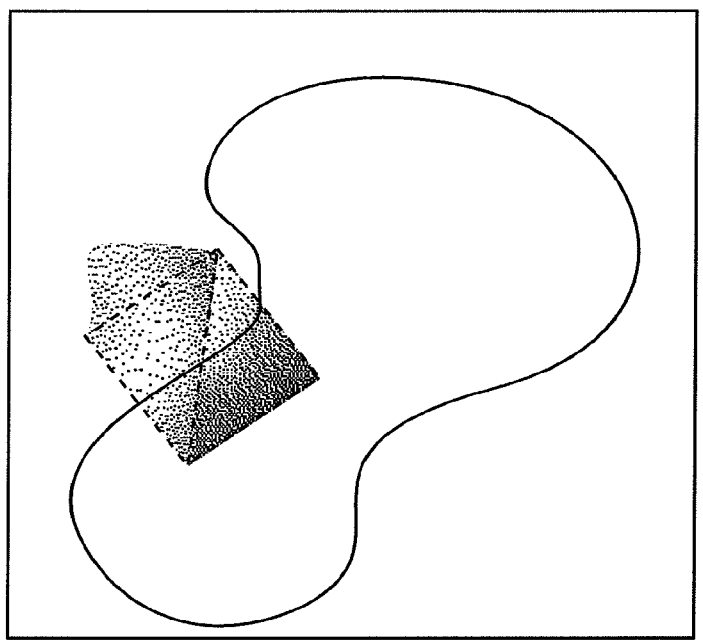
Figure 1:
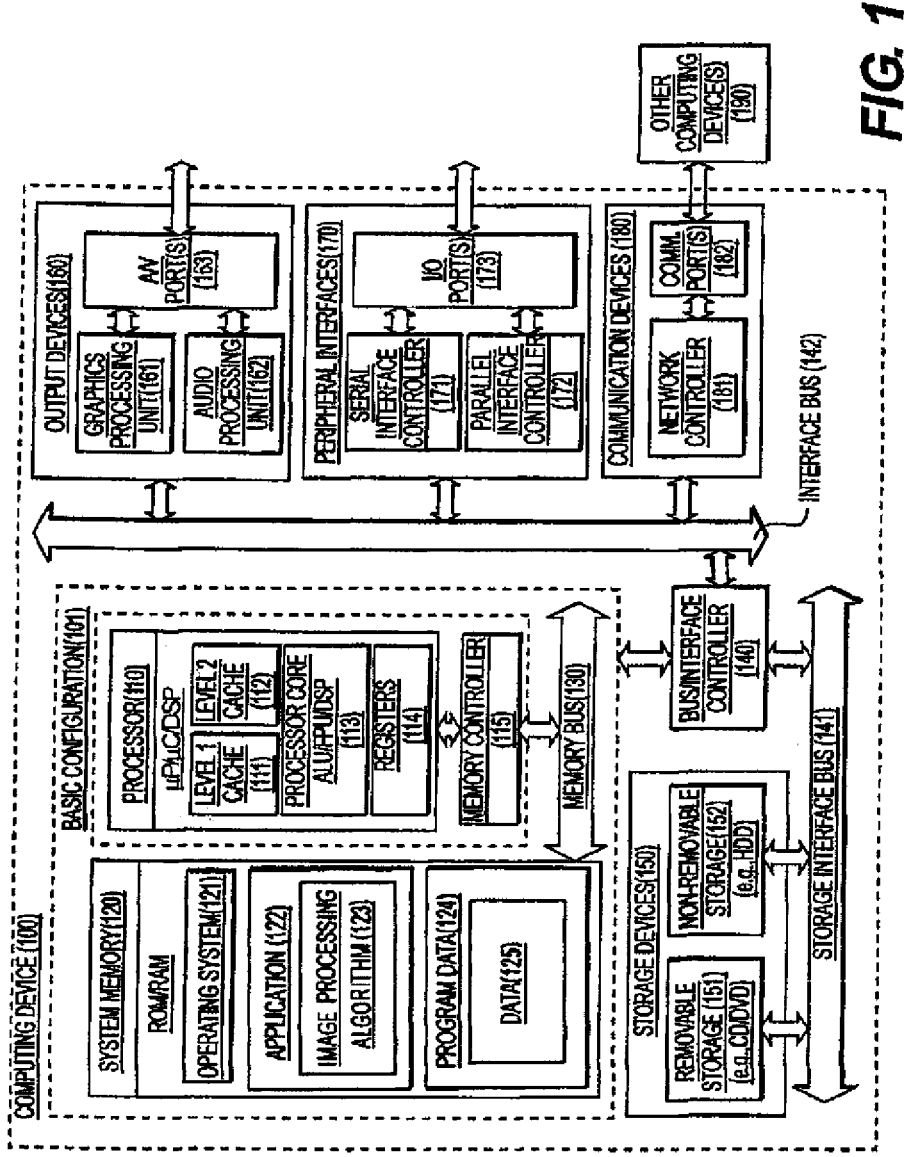
Figure 3:
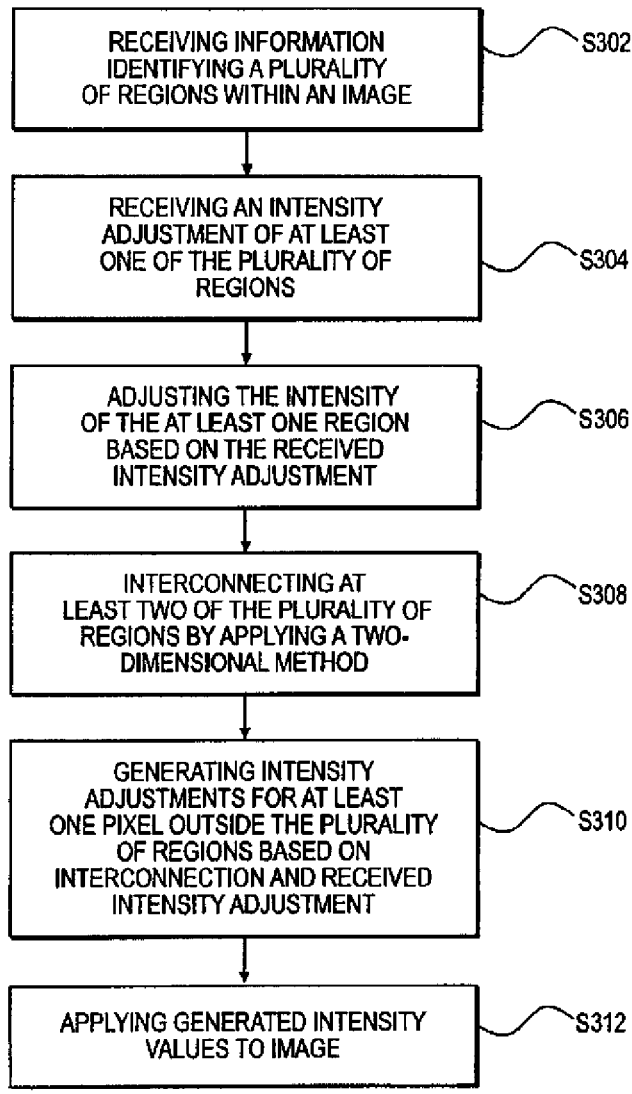

FIGS. 4A-4C depicts an example of image processing according to an example embodiment. As show in FIG. 4A, a tone mapped image is depicted. Regions 402 have been identified within the tone mapped image. Intensity adjustments 404 have been received with respect to each of the identified images.

In FIG. 4B, interconnection of at least two of the identified regions using Delaunay Triangulation is performed. The intensity adjustments are calculated for at least one of the pixels calculated outside the plurality of regions based on the triangulation and further based on the intensity adjustments 404. The pixels in the interconnected regions that have been adjusted based on intensity adjustments are depicted in FIG. 4B.

In FIG. 4C, the generated intensity adjustments are applied to the image wherein intensity adjustments are applied for pixels outside the plurality of regions based on the interconnection and the received intensity adjustment. The pixels outside the interconnected regions that have been adjusted are depicted in FIG. 4C.

There is little distinction left between hardware and software implementations of aspects of systems; the use of hardware or software is generally (but not always, in that in certain contexts the choice between hardware and software can become significant) a design choice representing cost vs.

efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

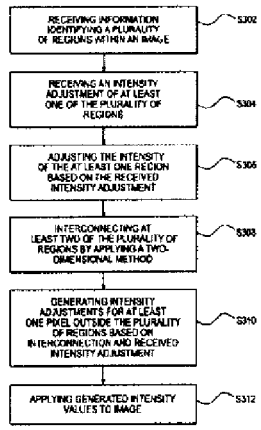

The invention claimed is:

1. A non-transitory computer-readable medium storing executable instructions that, when executed, cause a computer to perform operations comprising:
    receiving information identifying a plurality of regions within an image,
        wherein each of the plurality of regions includes a group of pixels;
    receiving an intensity adjustment of at least one of the plurality of regions,
        wherein the intensity adjustment includes an adjustment of pixel intensity of the at least one of the plurality of regions;
    adjusting the pixel intensity of the at least one plurality of regions based on the received intensity adjustment;
    interconnecting at least two of the plurality of regions by applying the adjusted pixel intensity to a two-dimensional method;
    generating intensity adjustments for at least one pixel outside the plurality of regions based on the received intensity adjustment of the at least one of the plurality of regions and the interconnection of the at least two of the plurality of regions; and
    applying the generated intensity adjustments to the image.

2. The non-transitory computer readable medium of claim 1, wherein the received information further identifies the plurality of regions in a tone mapped image.

3. The non-transitory computer readable medium of claim 1, wherein the at least one of the plurality of regions includes one of a circle or square.

4. The non-transitory computer readable medium of claim 1, wherein an intensity of the at least one of the plurality of regions is linearly adjusted.

5. The non-transitory computer readable medium of claim 1, wherein an intensity of the at least one of the plurality of regions is non-linearly adjusted.

6. The non-transitory computer readable medium of claim 1, wherein the two-dimensional method interconnecting the at least two of the plurality of regions is a linear function.

7. The non-transitory computer readable medium of claim 6, wherein the two-dimensional method includes a Delaunay triangulation.

8. The non-transitory computer readable medium of claim 1, wherein the intensity adjustments are generated by an interpolation and extrapolation method.

9. The non-transitory computer readable medium of claim 8, wherein the interpolation and extrapolation method includes a Barycentric method.

10. The non-transitory computer readable medium of claim 1, wherein the two-dimensional method is repeatable with the image.

11. An apparatus for intensity mapping of image data, comprising:
    a processor; and
    a storage unit configured to store executable instructions that, when executed, cause the processor to perform operations including:
        receiving information identifying a plurality of regions within an image,
            wherein each of the plurality of regions includes a group of pixels;
        receiving an intensity adjustment of at least one of the plurality of regions,
            wherein the intensity adjustment includes an adjustment of pixel intensity of the at least one of the plurality of regions;
        adjusting the pixel intensity of the at least one plurality of regions based on the received intensity adjustment;
        interconnecting at least two of the plurality of regions by applying the adjusted pixel intensity to a two-dimensional method;
        generating intensity adjustments for at least one pixel outside the plurality of regions based on the received intensity adjustment of the at least one of the plurality of regions and the interconnection of the at least two of the plurality of regions; and
        applying the generated intensity adjustments to the image.

12. The apparatus of claim 11, wherein the received information further identifies the plurality of regions in a tone mapped image.

13. The apparatus of claim 11, wherein the at least one of the plurality of regions includes one of a circle or square.

14. The apparatus of claim 11, wherein an intensity of the at least one of the plurality of regions is linearly adjusted.

15. The apparatus of claim 11, wherein an intensity of the at least one of the plurality of regions is non-linearly adjusted.

16. The apparatus of claim 11, wherein the two-dimensional method interconnecting the at least two of the plurality of regions includes a linear function.

17. The apparatus of claim 16, wherein the two-dimensional method includes a Delaunay triangulation.

18. The apparatus of claim 11, wherein the intensity adjustments are generated by an interpolation and extrapolation method.

19. The apparatus of claim 18, wherein the interpolation and extrapolation method includes a Barycentric method.

20. The apparatus of claim 11, wherein the two-dimensional method is repeatable with the image.

* * * * *

UNITED STATES PATENT AND TRADEMARK OFFICE
CERTIFICATE OF CORRECTION

| | | |
|---|---|---|
| PATENT NO. | : 8,687,908 B2 | Page 1 of 4 |
| APPLICATION NO. | : 13/853682 | |
| DATED | : April 1, 2014 | |
| INVENTOR(S) | : Yuan et al. | |

It is certified that error appears in the above-identified patent and that said Letters Patent is hereby corrected as shown below:

Delete the title page and substitute therefor with the attached title page showing the corrected illustrative figure.

In the Drawings

Delete Drawing Sheets 1 and 3 and substitute therefor with the attached Drawing Sheet 1 and 3. FIGS. 1 and 3 have been corrected.

In the Specification

In Column 3, Line 8, delete "device 120" and insert -- device 100 --, therefor.

In Column 3, Line 37, delete "device 120" and insert -- device 100 --, therefor.

In Column 3, Line 64, delete "device 120." and insert -- device 100. --, therefor.

In Column 3, Line 65, delete "device 120." and insert -- device 100. --, therefor.

In Column 3, Line 66, delete "device 120" and insert -- device 100 --, therefor.

In Column 5, Line 26, delete "A." and insert -- A". --, therefor.

In Column 6, Line 22, delete "(S604)." and insert -- (S304). --, therefor.

In Column 6, Line 43, delete "depicts" and insert -- depict --, therefor.

In Column 7, Line 36, delete "and or" and insert -- and/or --, therefor.

Signed and Sealed this
Thirteenth Day of January, 2015

Michelle K. Lee
*Deputy Director of the United States Patent and Trademark Office*

(12) United States Patent
Yuan et al.

(10) Patent No.: US 8,687,908 B2
(45) Date of Patent: *Apr. 1, 2014

(54) SAMPLE BASED TONE MAPPING METHOD FOR HIGH DYNAMIC RANGE IMAGES

(71) Applicant: Peking University, Beijing (CN)

(72) Inventors: Xiaoru Yuan, Beijing (CN); Peihong Guo, Beijing (CN)

(73) Assignee: Peking University, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/853,682

(22) Filed: Mar. 29, 2013

(65) Prior Publication Data

US 2013/0223746 A1 Aug. 29, 2013

Related U.S. Application Data

(63) Continuation of application No. 12/568,584, filed on Sep. 28, 2009, now Pat. No. 8,433,150.

(51) Int. Cl.
*G06K 9/00* (2006.01)
*G06F 17/24* (2006.01)
*H04N 9/31* (2006.01)

(52) U.S. Cl.
CPC ............ *G06F 17/243* (2013.01); *H04N 9/3194* (2013.01)
USPC ........................................................ 382/254

(58) Field of Classification Search
USPC ........................................................ 382/254
See application file for complete search history.

(56) References Cited

U.S. PATENT DOCUMENTS

| | | | |
|---|---|---|---|
| 6,888,552 B2 | 5/2005 | Debevec et al. | |
| 7,860,308 B2 * | 12/2010 | Shah | 382/170 |
| 7,958,462 B2 * | 6/2011 | Hashima et al. | 716/50 |
| 2005/0104900 A1 | 5/2005 | Toyama et al. | |
| 2006/0158462 A1 | 7/2006 | Toyama et al. | |
| 2007/0014470 A1 | 1/2007 | Sloan | |
| 2007/0291189 A1 | 12/2007 | Harville | |
| 2008/0131016 A1 | 6/2008 | Kokemohr | |
| 2009/0041376 A1 | 2/2009 | Carletta et al. | |

OTHER PUBLICATIONS

Debevec, P. E., and Malik, J., "Recovering High Dynamic Range Radiance Maps from Photographs," ACM SIGGRAPH, 1997, vol. 31, Issue: 1, pp: 369-378.
Durand, F., and Dorsey, J., "Fast Bilateral Filtering for the Display of High-Dynamic-Range Images," ACM SIGGRAPH, 2002, vol. 21, Issue: 3, pp. 257-266.
Fattal, R., "Gradient Domain High Dynamic Range Compression," ACM SIGGRAPH, 2002, vol. 21, Issue: 3, pp. 249-256.
Reinhard, E., "Photographic Tone Reproduction for Digital Images," ACM SIGGRAPH, 2002, vol. 21, Issue: 3, pp. 267-276.
Seetzen, H., "High Dynamic Range Display Systems," ACM SIGGRAPH, 2004, vol. 23, Issue: 3, pp. 760-768.

* cited by examiner

*Primary Examiner* — Hadi Akhavannik
(74) *Attorney, Agent, or Firm* — Brundidge & Stanger, P.C.

(57) ABSTRACT

The disclosure relates to adjusting intensities of images. The method includes receiving information identifying of a plurality of regions within an image; receiving an intensity adjustment of at least one of the plurality of regions; adjusting the intensities of the at least one plurality of regions based on the received intensity adjustment; interconnecting at least two of the plurality of regions by applying a two-dimensional method; generating intensity adjustments for at least one pixel outside the plurality of regions based on the received intensity adjustment of at least one of the plurality of regions and the interconnection of at least two of the plurality of regions; and applying the generated intensity adjustments to the image.

20 Claims, 5 Drawing Sheets